US007258913B2

(12) United States Patent
Jo et al.

(10) Patent No.: US 7,258,913 B2
(45) Date of Patent: Aug. 21, 2007

(54) PLASTIC FENCING SYSTEM REINFORCED WITH FIBERGLASS REINFORCED THERMOPLASTIC COMPOSITES

(75) Inventors: Byeong H. Jo, Blue Bell, PA (US); John B. Peavey, Maple Shade, NJ (US)

(73) Assignee: CertainTeed Corp., Valley Forge, PA (US)

( * ) Notice: Subject to any disclaimer, the term of this patent is extended or adjusted under 35 U.S.C. 154(b) by 95 days.

(21) Appl. No.: 10/281,795

(22) Filed: Oct. 28, 2002

(65) Prior Publication Data

US 2004/0081814 A1 Apr. 29, 2004

(51) Int. Cl.
  *D04H 1/00* (2006.01)
  *E04H 17/14* (2006.01)

(52) U.S. Cl. .................. 428/292.1; 256/19; 256/24

(58) Field of Classification Search ............... 428/357, 428/364, 292.1, 241, 384; 52/177, 181; 256/19, 256/24; 523/204; 524/494; 238/84, 91
See application file for complete search history.

(56) References Cited

U.S. PATENT DOCUMENTS

| | | | |
|---|---|---|---|
| 3,983,295 A | | 9/1976 | Murer et al. |
| 3,983,668 A | * | 10/1976 | Hassman ............... 52/177 |
| 4,265,981 A | | 5/1981 | Campbell |
| 4,480,996 A | | 11/1984 | Crovatto |
| 4,571,118 A | | 2/1986 | Schumanski |
| 4,649,008 A | | 3/1987 | Johnstone et al. |
| 4,812,343 A | | 3/1989 | Kiekhaefer et al. |
| 4,820,749 A | | 4/1989 | Beshay |
| 4,860,996 A | | 8/1989 | Robbins, III |
| 5,008,310 A | | 4/1991 | Beshay |

(Continued)

OTHER PUBLICATIONS

Google Web Directory, "Composite Plastic", May 12, 2003, 4 pages.
Google Editorial Calendar, "Plastic Fencing", May 12, 2001, 2 pages.
Matuana et al., Polymer Engineering and Science, "Processing and cell morphology relationships for Microcellular foamed PVC/wood fiber composites", vol. 37, No. 7, Jul. 1997, pp 1137–1147.
Matuana et al., Cellular and Microcellular Materials, Effect of cell morphology on the properties of microcellular foamed PVC/wood fiber composites, vol. 76, 1993, 16 pages.
Saint–Gobain Vetrotex,Twintex, Products Available, Trade literature, May 21, 2004, pp 1,2.
Saint–Gobain Vetrotex, Twintex, News, Trade literature, , May 21, 2004, pp 1–3.
International Search Report dated Jan. 22, 2003.
Kroy Trade literature, Section 02820, Fences and Gates, Sep. 2002, pp 1–8.
Kroy Trade literature, Beyond Black™ Ornamental Fence, Jul. 8, 2003, pp1–2.

(Continued)

*Primary Examiner*—N. Edwards
(74) *Attorney, Agent, or Firm*—Duane Morris LLP

(57) ABSTRACT

The present invention relates to a consolidated form of the commingled continuous filaments of glass fibers and polymeric fibers as reinforcement. The consolidation of the commingled fibers into composite reinforcement can be used in a continuous form or bulk molding compound pellets. The consolidation of the commingled fibers into composite reinforcement can be made in-situ during in-line extrusion of the final end product extrudate, or prepared as a tape or rod and incorporated into an off-line extrusion of final product. The bulk molding pellets are used solely or diluted with an addition of polymeric material for mono or co-extrusion or compression molding.

12 Claims, 2 Drawing Sheets

U.S. PATENT DOCUMENTS

| | | | |
|---|---|---|---|
| 5,030,662 | A | 7/1991 | Banerjie |
| 5,189,822 | A | 3/1993 | Schmanski et al. |
| 5,219,656 | A | 6/1993 | Klett et al. |
| 5,318,737 | A | 6/1994 | Trabert et al. |
| 5,486,416 | A * | 1/1996 | Johnson et al. ............. 428/357 |
| 5,529,431 | A | 6/1996 | Walsh |
| 5,547,325 | A | 8/1996 | Tucker et al. |
| 5,580,626 | A | 12/1996 | Quigley et al. |
| 5,792,529 | A | 8/1998 | May |
| 5,839,247 | A | 11/1998 | Beck |
| 5,847,016 | A | 12/1998 | Cope |
| 5,916,932 | A * | 6/1999 | Nosker et al. ............. 523/204 |
| 5,967,498 | A | 10/1999 | Junell |
| 5,997,784 | A | 12/1999 | Karnoski |
| 6,042,305 | A | 3/2000 | Novich et al. |
| 6,125,905 | A | 10/2000 | Woodside et al. |
| 6,156,682 | A | 12/2000 | Fletemier et al. |
| 6,197,412 | B1 | 3/2001 | Jambois |
| 6,344,268 | B1 | 2/2002 | Stucky et al. |
| 6,357,197 | B1 | 3/2002 | Serino et al. |
| 6,427,395 | B1 * | 8/2002 | Elsasser et al. ............... 52/181 |
| 6,502,360 | B2 | 1/2003 | Carr et al. |
| 6,758,996 | B2 | 7/2004 | Monovoukas et al. |
| 7,074,918 | B2 | 7/2006 | Medoff et al. |
| 2003/0004232 | A1 | 1/2003 | Ruede |
| 2003/0021915 | A1 | 1/2003 | Rohatgi et al. |
| 2003/0082338 | A1 | 5/2003 | Baker |
| 2003/0096096 | A1 | 5/2003 | Jo et al. |
| 2003/0198763 | A1 | 10/2003 | Fensel et al. |
| 2004/0048055 | A1 | 3/2004 | Branca |
| 2005/0266210 | A1 | 12/2005 | Dolinar et al. |
| 2005/0271872 | A1 | 12/2005 | Dolinar |
| 2005/0271889 | A1 | 12/2005 | Dolinar |
| 2006/0068215 | A2 | 3/2006 | Dolinar |

OTHER PUBLICATIONS

International Search Report dated Feb. 19, 2004.
Office Action dated Dec. 14, 2005 in U.S. Appl. No. 10/939, 600 (D0932–00482).
Office Action dated Aug. 29, 2006 in U.S. Appl. No. 10/441,530 (D0932–00393).
Office Action dated Aug. 3, 2005 in U.S. Appl. No. 10/441, 530 (D0932–00393).
Office Action dated Jan. 30, 2006, in U.S. Appl. No. 10/441, 530 (D0932–00580).
Saint–Gobain Vetrotex, Twintex Overview, trade literature, pp. 1–2, 2001.
Office Action dated Nov. 17, 2004 in U.S. Appl. No. 10/281,796 (D0932–00220).
Office Action dated Jan. 29, 2003 in U.S. Appl. No. 09// 988,985 (D0932–00178).
Office Action dated Sep. 22, 2003 in U.S. Appl. No. 09/988, 985 (D0932–00178).
Office Action dated Jan. 27, 2004 in U.S. Appl. No. 09/988, 985 (D0932–00178).
Office Action dated Oct. 18, 2004 in U.S. Appl. No. 09/988, 985 (D0932–0178).
Office Action dated Mar. 21, 2005 in U.S. Appl. No. 09/988, 985 (D0932–00178).
Office Action dated Jan. 30, 2006 in U.S. Appl. No. 10/441, 530 (D0932–00393).
Prestige Wake up to the newest thing in fencing. Bufftech. trade literature, 5 pages.
Prestige. Set yourself apart. Bufftech. trade literature, 6 pages.
Twintex Applications. Votrotex. trade literature, 1 page.
Glossary of Terms, Introduction to Composites, pp. 19 and 20.
Harvey, Martin T., "Thermoplastic Matrix Processing", pp. 544–553.
Martin, Jeffrey D., "Pultrusion", pp. 533–543.
Tecton Products: Innovative Composite Pultrusion Solutions, trade literature, 2 pages.
E–Z Rail Products, trade literature, 2 pages.
Geotek: Your Scource For Qulaity Animal Containment, trade literature 3 pages.
Testing Hardness of a Mineral, Mohs Hardness Scale, Trade literature, Http:/realgar.mcli.dist.maricopa.edu/aaim/linear/LO.html.
Kroy Trade literature, Section 02820, Fences and Gates, Sep. 2002, pp. 1–8.
"Trex coextrudes white PVC railing", Trade literature, Jan. 21, 2005, 2 pages, http://finance.messages.yahoo.com/bbs?.mm=FN&action=m&board?18343131&tid=twp.
Wood Extrusion, Wood is Good for Compounding, Sheet & Profile, Trade Literature, Feb. 22, 2005, 6 pages http://www.feedscrews.com/shownews/381.
ebuild, The Professional's Guide to Building Products™, Trade literature, Aug. 19, 2004, 4 pages http://www.ebuild.com/guide/resources/product–news–print.asp?id=68609.
Woodchuk Composite Railing System, Performs Better Than Wood Could, Trade literature, 2005, 4 pages http://woodchuk.com.

* cited by examiner

PLASTIC FENCING SYSTEM REINFORCED WITH FIBERGLASS REINFORCED THERMOPLASTIC COMPOSITES

CROSS REFERENCE TO RELATED APPLICATIONS

The present application is related to U.S. Ser. No. 09/988,985 filed on Nov. 19, 2001, entitled "Plastic Rail System Reinforced with Fiberglass Thermoplastic Composites", and is also related to U.S. Ser. No. 10/281,796, filed on Oct. 28, 2002, entitled "Thermoplastic Composite Decking Profile of Continuous Fiber Reinforcement". The present application is also related to commonly assigned U.S. Pat. No. 6,344,268, entitled "Foamed Polymer-Fiber Composite", issued Feb. 5, 2002.

FIELD OF THE INVENTION

The present invention relates to a consolidated form of the commingled continuous filaments of glass fibers and polymeric fibers as reinforcement.

BACKGROUND OF THE INVENTION

Most fence and rail materials are either traditional lumber or thermoplastics. Typical plastics in these applications are PVC (polyvinyl chloride) and polyethylene. PVC typically does not have the strength and rigidity of wood and lumber and therefore, the rail for the fence and railing needs the steel or aluminum reinforcement channel inside the rail. These metal reinforcements are prone to corrosion attack, and lose strength in long-term endurance. Also, the problem exists as to the dark color of thermoplastic products. The dark color fence and rail made out of PVC or other polymeric materials has not been successful in the past. The products show bowing due to differences in expansion and contraction between the two different sides of the product upon exposure of sunlight. In addition, the dark color absorbs heat readily and the resultant uneven heat buildup causes this deformation. An additional problem is the lack of long-term stiffness of the products. It has limited the rail span between the posts to less than traditional lumber.

Thus, synthetic decks, whether composed of plastic or wood-plastic composite materials, do not fully satisfy market needs.

Wood-plastic composite planks are produced by extrusion, and the extrusion has various limitations. Extrusion uses an embossing roll to create a wood grain surface. The quality of such wood grains is often not particularly high. Furthermore, the wood composite deck planks are heavy, since the wood composite has a lower modulus and flexural strength, needing a thick wall to compensate for these strength levels. In addition, the wood composite deck does not have color fastness; it changes color from natural or gray to silver-gray over time, in a non-uniform manner when exposed to the outdoor environment.

As noted above, there is another class of synthetic deck planks available, namely the PVC profile decks. Such decks are produced by profile extrusion. In this type of production, it is often difficult to use an embossing roll to create the wood grain texture in a uniform nature on the deck surface. The pressure imposed by the embossing roll often cannot provide a uniform force, because the surface of a hollow and three-dimensional panel responds in a non-uniform manner to the particular force. As result, a "real wood" grain emulated surface is particularly difficult to achieve. The PVC profile deck also has a significant thermal expansion coefficient; installation requires care in order to accommodate the expansion and contraction of changes in temperature. In this regard, the dark color deck panel materials have not been practical, since the heat build-up on the surface is more pronounced for darker colored panels. Regarding color fastness, the darker color PVC is superior to wood-plastic composites, but still has the tendency to lose its original color to a visible degree. Furthermore, PVC has a tendency to become brittle with aging upon outdoor exposure, resulting in a loss of its impact strength.

The present invention serves to correct the shortcomings noted above. The deck panel produced in accordance with the present invention has superior resistance to color fading, possesses superior cold impact strength, has a well-defined wood grain surface, and is light-weight.

One of the objectives of the present invention is the production of a high strength plastic alternative to the traditional wrought iron or aluminum ornamental rail and fence. Metal fences and rails are constantly under the threat of corrosion attack, and need periodic painting. To date, there have not been any non-composite products with the necessary performance properties and aesthetic appearance comparable to these metal products. In that sense, there have not been any thermoplastic composite products in the market. The present invention discloses thermoplastic composite products that resemble wrought iron, and aluminum wrought iron alternative, but are maintenance-free, kink-free, light and perform equally as well.

An additional objective is to make the dark color thermoplastic post and rail fence (e.g., split post and rails) possible. The fiberglass reinforcement stabilizes the uneven contraction and expansion, in spite of different heat buildup on the surface.

A further objective of the present invention is providing non-metallic heavy duty rail and fence systems for use in industrial and commercial applications. The metallic railing in an industrial atmosphere is often exposed to chemical gases or acids and is prone to corrosion attack. The integrity of the industrial railing is critical for the safety of those in the workplace. The thermoplastic railing system that is strengthened by reinforcing tapes or rods of fiberglass/thermoplastic polymer composite provides superior strength and rigidity to its metal counterparts.

DESCRIPTION OF THE PREFERRED EMBODIMENTS

Figure 1:
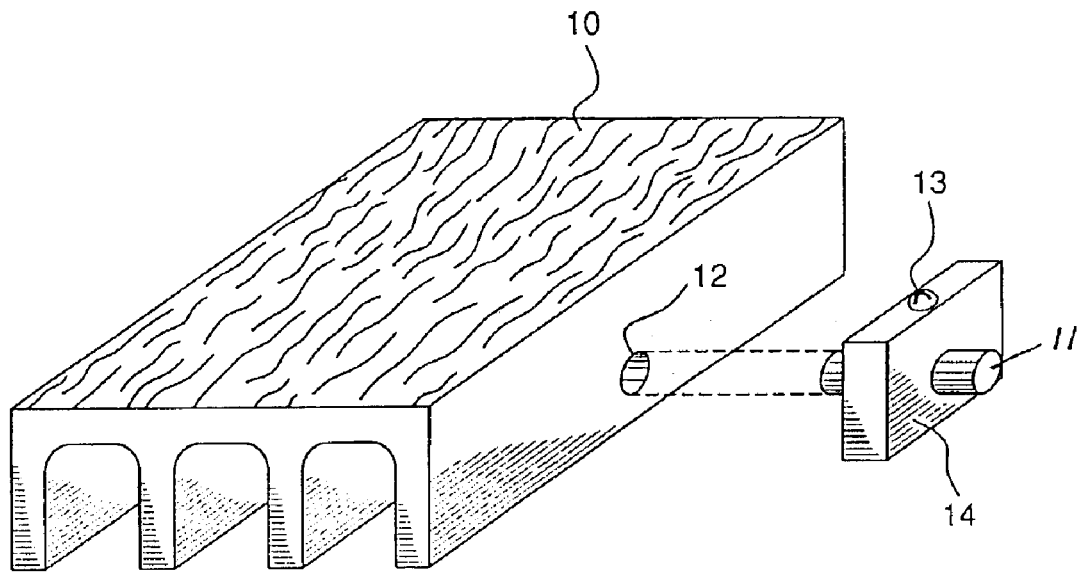
FIG. 1 is a front perspective view of a deck construction using the preferred composite.

The present invention relates to a consolidated form of the commingled continuous filaments of glass fibers and polymeric fibers as reinforcement. The consolidation of the commingled fibers into composite reinforcement may be made in-situ during in-line extrusion of the final end product extrudate, or, alternatively, prepared as a tape or rod and incorporated into an off-line extrusion of final product. In either case, the materials of the present invention are incorporated through a cross-head die into the polymer extrudate. In this way, the matrix polymer encapsulates the inside and outside surface of the hollow profile product.

Another production process is to subject these commingled fibers through pultrusion and its die, followed by overlay extrusion of a cap stock polymer using a separate extruder, all in-line. In this case, the capstock polymer covers only the outside surface. The commingled fibers are heated prior to entering into the series of forming dies where they are consolidated. In a further embodiment, a helical winding machine may be added in order to enhance the strength in the hoop direction before the die entrance.

A preferred material for use in the present invention is Twintex™ composite tapes, supplied by the Saint-Gobain Corporation. The Twintex materials are present in various forms, such as commingled roving and fabrics (unidirectional, or multi-axial woven fabric or tapes). The commingled roving is consolidated through a pultrusion die into a thermoplastic composite tape or rod. It contains glass fibers dispersed uniformly in a longitudinal direction. The polymeric fiber that becomes the consolidation matrix may be either polyethylene (PE), polypropylene (PP) or polyesters (PBT or PET). The functional need of the end product and extrusion process will determine the fiberglass contact in the Twintex material and the volume of the consolidated reinforcement. A "standard" Twintex material contains about 40%–75% glass fiber content.

Although polyethylene and polypropylene Twintex tapes were used in the testing of the present invention, any polymeric materials would be acceptable to be a commingled fiber with glass fiber, as long as they are capable of being fiberized and made compatible to the intended matrix polymers.

A further aspect of the present invention relates to the compatibility of the commingled polymeric fiber material with the matrix polymer of the final extrusion product. These materials need adhesion with each other in order to be effective. In the testing of the present invention, a polyethylene-glass fiber Twintex reinforcement/HMPE polymer, polypropylene-glass fiber Twintex reinforcement/ HMPE polymer, polyethylene-glass fiber Twintex reinforcement/polyethylene polymer, and polypropylene glass fiber Twintex reinforcement/polyethylene polymer were used. The combinations of the polymers of the composite reinforcement and the base polymers are numerous, and may be customized in order to meet the needs of the final product performance requirements.

The Twintex composite reinforcement allows for the base polymeric material with a higher impact in both cold and ambient temperatures, lower heat expansion coefficient, higher tensile and flexural strength, as well as higher rigidity. These Twintex reinforcements (rods, tapes or fabrics) are embedded into strategic locations of the basic polymeric material.

In a further preferred embodiment of the present invention, a hybrid of Twintex filaments with carbon fibers may be utilized, with the combination providing for higher stiffness and for easier material handling, as well as providing for a lighter weight product as well.

The materials of the present invention may be manufactured by a pultrusion process, the mechanics of which are familiar to those of skill in the art. The process utilizes continuous Twintex fibers (roving or yarn), and other fiber as necessary, in order to process uniaxially reinforced profiles with exceptional longitudinal strength. Modification of the basic process allows for the incorporation of transverse reinforcements. Important components of the pultrusion process are: (1) heating, wherein the thermoplastic fibers are melted, and (2) the consolidation and shape forming at the tooling die, in which relatively high pressure is involved.

In a further preferred embodiment, the commingled, continuous filaments of glass fibers and polymeric fibers include from about 40%–80% glass fiber content. These commingled, continuous filaments may further include carbon fibers and/or aramid fibers. Furthermore, a bulk molding compound may be made out of the commingled, continuous filaments of glass fibers and polymeric fibers. This bulk molding compound may be compression molded into particular building products, such as fence, rail, post and deck materials. The commingled, continuous filaments may be added through, e.g., a helical winding machine.

In a further preferred embodiment of the present invention, the bulk molding compound includes from about 20%–80% glass fiber content, or is diluted with an addition of polymeric pellets to a glass fiber content to 10%–20% in the final product, with a glass fiber content of about 15% preferred. The thermal expansion and contraction of the composite building material is controlled by the use of the bulk molding compound.

Figure 2:
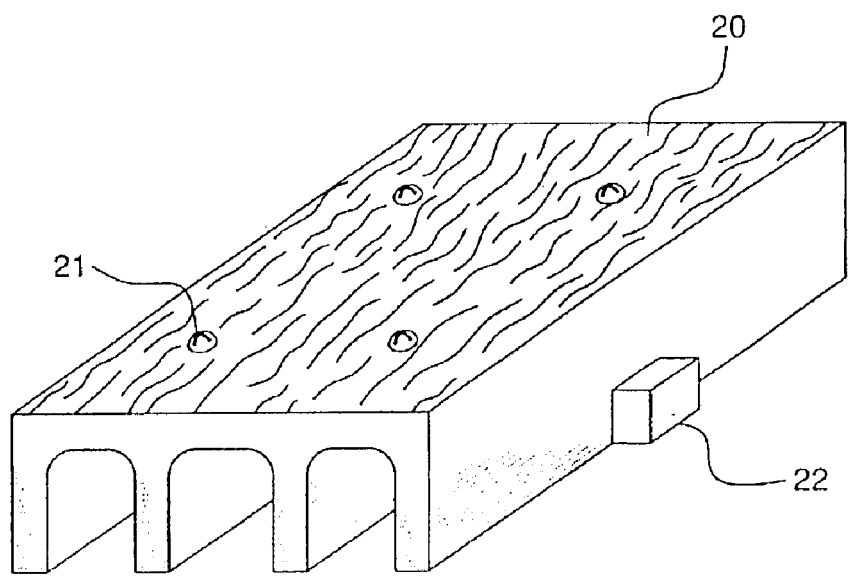
FIGS. 2 and 3 are front perspective views of alternative deck constructions.
Figure 3:
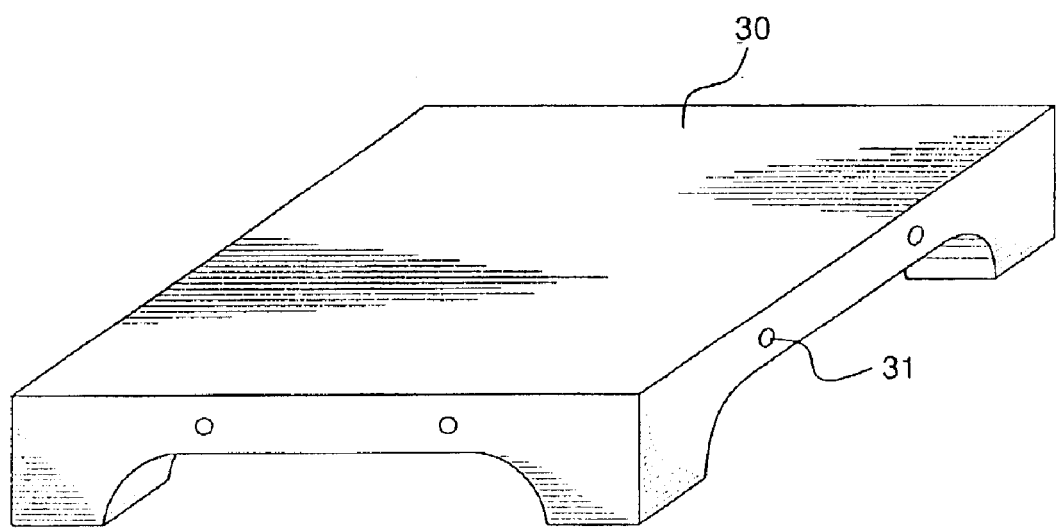

Wood-plastic composite panels commercially available have a stiffness of about 100,000 PSI. In order to match that stiffness, the present inventors incorporated one half inch to one inch long fiberglass of 10% at minimum, with a profile height of about 1.25 to 1.5 inches. These dimensions will result in the composite material having a flexural modulus of about 400,000 PSI or higher. In a preferred embodiment, polymeric materials, specifically polypropylene copolymers with a melt index of about ten and higher, and formulated with a UV stabilizer and colorant, were tested. Note that other polymeric materials may be used for the purposes of the present invention, so long as such materials have an adequate melt index. Measurement of melt flow index was described in ASTM D 1238. By incorporating fiberglass in the formulation by means of a bulk molding compound, the thermal expansions and contraction was reduced so that the dark brown color was no longer present. The thermal coefficient of linear expansion was reduced by more than $\frac{1}{6}$, to about $1\times10^{-5}$ inch/inch/° F. for the polypropylene copolymer. In reference to the figures, FIGS. 1, 3 and FIG. 2 demonstrate differing ways by which the panels may be fastened to the substructure. In FIG. 2, screw fasteners 21 on the top of composite 20 provide the fastening function; relative to composites 10 and 30, as shown in FIGS. 1 and 3 respectively, a concealed fastener 14 with pin 11 is formulated to key into the side hole 12 or 31 of composite panel 10 or 30, and screwed into the substructure joist by screw 13. The pins act to hold adjacent panels together in a spaced relationship, while the low profile of the fastener 14 helps to conceal both the fastener 14 and the screw 13. The panel 20 of FIG. 2, in contrast, has an integral spacer 22 without pins.

Note that the preferred process for achieving the construction of the present invention is compression molding. The molding process provides a wood grain pattern of high quality. In operation, a fiberglass bulk molding compound is processed through a specially designed plasticator, and the billet is shuttled to a compression mold, and pressed. Note further that the plasticator is merely one type of compounding extruder equipped with a screw, designed to process the fiberglass in the bulk molding compound without breaking the fiberglass. Panel lengths produced by the compression molding process may range up to about 20 feet. The compression molding enables the surface of the panels to have customized patterns, as well as slip resistance called for by various industry codes.

Thus, the present invention relates to any walking panels or planks which have incorporated fiberglass of at least about ½ inch long, at about 10% to 40% by weight into a polymeric material of a melt index higher than e.g., about 2, in order to improve the impact strength for both "under room" and cold temperatures. Walking panels or planks with these characteristics may be made into any suitable custom colors, particularly dark colors, and serve to meet relevant building codes, performance criteria, deflection and creep resistance. Furthermore, a quality grain structure is achieved on the surface of the walking panels or planks, thereby controlling slip resistance.

The fiberglass component of the present invention may be chopped fiberglass, hybridized with other modulus enhancing fibers. In a further preferred embodiment, the walking panels or planks may have incorporated mold-in spacers, for ease of installation. Furthermore, the panels or planks of the present invention may be constructed of fiberglass bulk molding compound, using a compression molding process having a concealed fastener; such materials will make cutting easier by a power driven saw or other related device.

In a further preferred embodiment of the present invention, a rail of more than an eight foot span between the two posts, on a sixteen foot length encompassing two sections with, e.g., three posts with a Twintex reinforcement, is a possible alternative. The use of a hybrid reinforcement of Twintex commingled fiber and other reinforcement fibers, such as carbon fiber and/or aramid fibers is also possible.

Thus, the bulk molding compounds used for purposes of the present invention may be employed for compression molding into building products including fence, rail, post, deck, etc.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

We claim:

1. A polymer composite fencing member, comprising glass fibers within a thermoplastic matrix, said thermoplastic matrix containing a resin selected from the group consisting of: polyethylene, polypropylene, HMIPE, or a combination thereof, said fencing member having at least about 10 wt.% glass fibers and a flexural modulus of at least 400,000 PSI, and said thermoplastic matrix having a melt index of at least about 2, as measured by the ASTM D1238 test method.

2. The fencing member of claim 1, wherein said thermoplastic matrix comprises a bulk molding compound.

3. The fencing member of claim 1, wherein said thermoplastic matrix comprises at least two resins selected from the group consisting of polyethylene, HMIPE and polypropylene.

4. The fencing member of claim 1, wherein said fencing member comprises a molded wood grain disposed thereon.

5. The fencing member of claim 1 wherein said glass fibers comprise fibers selected from the group consisting of: continuous filaments, chopped glass fibers, or both.

6. The fencing member of claim 1 wherein said glass fibers comprise continuous filaments and chopped glass fibers.

7. A polymer composite fencing member comprising a first portion including continuous glass filaments disposed within a first thermoplastic matrix portion and a second portion comprising a second thermoplastic matrix portion, said first thermoplastic matrix portion having at least about 10 wt.% glass fibers; said first and second thermoplastic matrices containing one or more of resins selected from the group consisting of polyethylene, HMPE and polypropylene.

8. The fencing member of claim 7, wherein said first and second thermoplastic matrix portions comprise different, but compatible, resins.

9. The fencing member of claim 7, wherein said second thermoplastic matrix portion comprises a bulk molding compound.

10. The fencing member of claim 7, wherein said second thermoplastic matrix portion comprises chopped glass fibers.

11. The polymer composite fencing member of claim 7, where said molded pattern comprises an embossed wood grain.

12. The polymer composite fencing member of claim 7, wherein said thermoplastic matrix comprises an additive selected from the group consisting of: a colorant, a UV stabilizer, or both.

* * * * *